United States Patent [19]
Horrocks

[11] 4,181,855
[45] Jan. 1, 1980

[54] METHOD AND APPARATUS FOR DETERMINING RANDOM COINCIDENCE COUNT RATE IN A SCINTILLATION COUNTER UTILIZING THE COINCIDENCE TECHNIQUE

[75] Inventor: Donald L. Horrocks, Placentia, Calif.

[73] Assignee: Beckman Instruments, Inc., Fullerton, Calif.

[21] Appl. No.: 873,318

[22] Filed: Jan. 30, 1978

[51] Int. Cl.² .................................................. G10T 1/20
[52] U.S. Cl. .................................. 250/363 R; 250/366; 250/369; 328/110; 307/232
[58] Field of Search ............... 250/366, 369, 328, 361, 250/362, 363; 328/109, 110; 307/232

[56] References Cited
U.S. PATENT DOCUMENTS

| | | | |
|---|---|---|---|
| 3,772,512 | 11/1973 | Laney | 250/366 |
| 4,031,392 | 6/1977 | Giraud et al. | 250/369 |
| 4,071,761 | 1/1978 | Horrocks | 250/369 |

OTHER PUBLICATIONS

R. G. Suchannek et al., Method for Measuring Coincidences in the Presence of a High Level of Accidential Coincidences, Rev. Sci. Instrum., vol. 46, No. 8, 1975, pp. 1037–1039.

*Primary Examiner*—Alfred E. Smith
*Assistant Examiner*—Carolyn E. Fields
*Attorney, Agent, or Firm*—R. J. Steinmeyer; Robert R. Meads

[57] ABSTRACT

A method and related apparatus for the reliable determination of a random coincidence count attributable to chance coincidences of single-photon events which are each detected in only a single detector of a scintillation counter utilizing two detectors in a coincidence counting technique. A first delay device is employed to delay output pulses from one detector, and then the delayed signal is compared with the undelayed signal from the other detector in a coincidence circuit, to obtain an approximate random coincidence count. The output of the coincidence circuit is then applied to an anti-coincidence circuit, where it is corrected by elimination of pulses coincident with, and attributable to, conventionally detected real coincidences, and by elimination of pulses coincident with, and attributable to, real coincidences that have been delayed by a second delay device having the same time parameter as the first.

8 Claims, 5 Drawing Figures

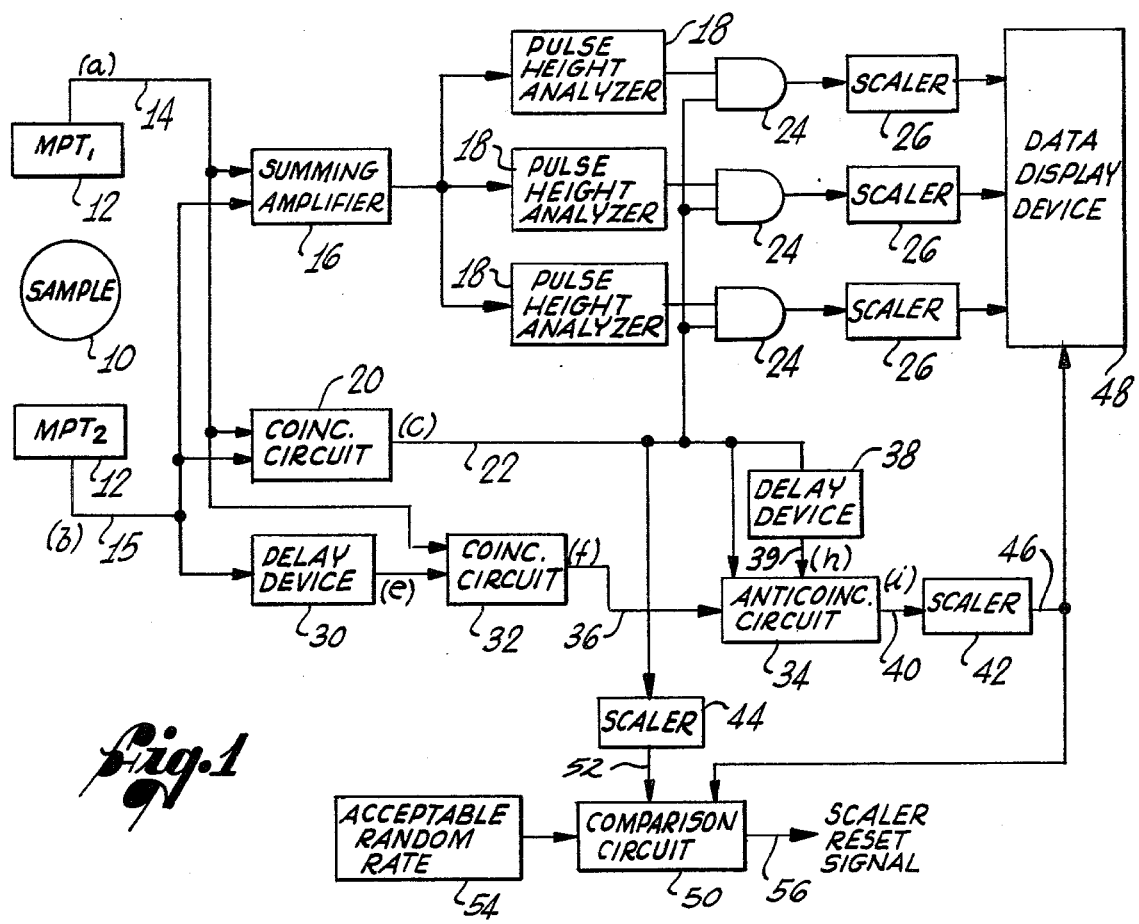
Fig.1
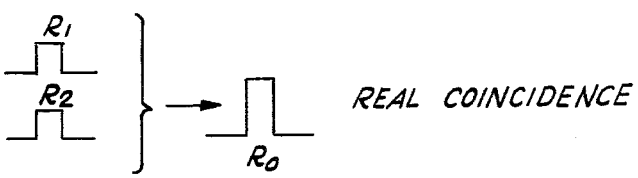
Fig.2a — REAL COINCIDENCE
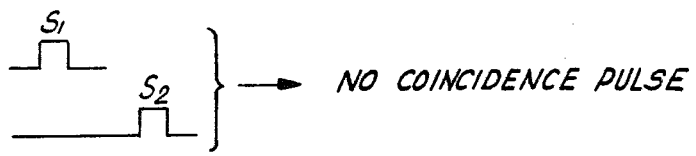
Fig.2b — NO COINCIDENCE PULSE
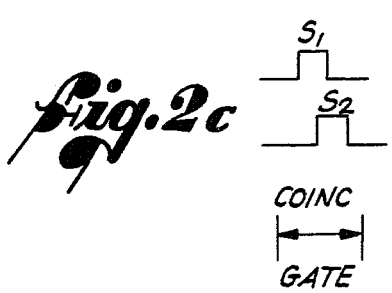
Fig.2c — CHANCE COINCIDENCE

METHOD AND APPARATUS FOR DETERMINING RANDOM COINCIDENCE COUNT RATE IN A SCINTILLATION COUNTER UTILIZING THE COINCIDENCE TECHNIQUE

BACKGROUND OF THE INVENTION

This invention relates generally to the measurement of radioactivity utilizing what is generally referred to as the coincidence counting technique, wherein events relating to radioactive decay are detected in two or more detectors within a given time interval, in order to eliminate various sources of error which would be introduced if only one detector were used. More particularly, the invention relates to a new and improved method, and related apparatus, for eliminating a further source of error due to the detection of chance or random coincidences in the multiple detectors.

One of the most widely used devices for the measurement of radiation from radioactive substances is the scintillation counter. The basic element of a scintillation counter is a scintillation medium which absorbs incident radiation and emits photons as a result. Many of the emitted photons are incident upon a photocathode in a nearby multiplier phototube, and are converted to photoelectrons emitted from the photocathode. The electrons emitted from the photocathode are multiplied in number at a succession of phototube electrodes, called dynodes, and the output of the multiplier phototube is a measurable electrical pulse having a magnitude which is approximately proportional to the energy of the incident radiation.

A liquid scintillation counter operates on the same basic principle, except that the scintillation medium is a liquid into which is dissolved, suspended or otherwise intermixed with sample being tested. The radioactivity of the sample can then be measured by collecting the photons emitted from the scintillation medium in a multiplier phototube positioned near the sample, and counting the pulses generated by the tube in appropriate electrical circuitry. Depending on the characteristics of the sample being measured, and on the particular tests being performed, this electrical circuitry usually performs some type of pulse height analysis on the pulse output from the phototube, since it is usually desired to detect and count radioactive events within a particular range or window of energy levels.

A significant problem encountered in the measurement of radioactivity by means of scintillation counters is that there are a number of phenomena unrelated to the radioactivity of the sample which nevertheless result in the generation of output pulses from the multiplier phototube of a scintillation counter. These phenomena are frequently referred to as "singles" events since they are all characterized by the emission of single photons or photoelectrons. A relatively large source of "singles" events is the thermionic emission of electrons from the photocathode or from the dynodes of the multiplier phototube itself. Such electrons are emitted independently of any detected radiation, and can result in significant error, especially if the tubes are operated at relatively high voltages, the typical case where high amplification factors are being used, as in the measurement of relatively low radiation levels. This thermionic emission of electrons is also referred to as "tube noise."

In liquid scintillation counters, the sample itself may emit photons by some process unrelated to its radioactivity. The sample material could exhibit some degree of chemiluminescence, i.e., there may be some chemical reaction or reactions occurring within the sample material which result in the emission of photons. The sample material may also be subject to the processes of bioluminescence or photoluminescence, which also generate photons independently of the level of radioactivity of the sample material. In addition, the presence of low-level background radiation, static electrical discharges, or a leakage of ambient light into the counter, could give rise to "singles" events detectable by the scintillation counter.

Use of the well known coincidence counting technique substantially reduces the detection of "singles" events by a scintillation counter. In a liquid scintillation counter, this technique is utilized by employing at least two multiplier phototubes disposed one on each side of the sample. The emission of many single radioactive particles by the sample can typically result in the emission of about seven or more photons simultaneously, or nearly simultaneously. Thus, there is a high probability that such an event will be detected by both phototubes at nearly the same time. A "singles" event, however, such as one resulting from chemiluminescence, or from a thermionically emitted electron in one of the tubes, would result in an output pulse from only one of the tubes. It can be appreciated, then, that the use of the coincidence counting technique results in the elimination of most of the "singles" events from the counting process.

It will also be apparent, however, that, because of the random nature of the "singles" events, there is a significant probability that a "singles" event could be detected in one tube at nearly the same instant in time that one is detected in the other tube. There is, therefore, a random coincidence rate resulting from random or chance coincidences of unrelated "singles" events. Mathematically, the random coincidence count rate $S_c$ is given by:

$$S_c = 2\tau_c S_1 S_2, \qquad (1)$$

where:
 $\tau_c$ = the resolving time of the coincidence counter, i.e., the longest time separating two pulses which would still be considered coincident,
 $S_1$ = the "singles" count rate measured by one of the multiplier phototubes, and
 $S_2$ = the "singles" count rate measured by the other of the multiplier phototubes.

Under normal operation, a liquid scintillation counter will give a measured count rate ($S_m$) which will be the sum of the sample coincidence count rate ($S_a$) and the "singles" random coincidence count rate ($S_c$). That is:

$$S_m = S_a + S_c. \qquad (2)$$

Any user of a liquid scintillation counter ideally needs to know the value of $S_c$ so that, where possible, a correction can be made to obtain the correct value of radiation attributable to the sample only. Even where direct correction is not possible, because testing is being performed in specific energy level "windows," the user of the counter could still use the value of $S_c$ as an indication of the reliability of the measured count rate.

Prior to this invention, a precise determination of the random coincidence rate has not been possible, except as disclosed and claimed in U.S. Pat. No. 4,071,761 bearing the same title and having the same inventor as the present application. Although the technique disclosed in the prior application provides a highly satisfactory solution to the problem posed by the occurrence of random coincidences, it requires the use of a counting channel for measurement of a single-photon count. Accordingly, there is still a need for an alternative solution to the problem.

Prior art techniques have been limited to making a qualitative estimate of the presence of those "singles" events which decrease with time. Usually chemiluminescence, bioluminescence and photoluminescence have this decay characteristic. In accordance with such prior art techniques, the radioactivity of a sample would be measured at different times, and the measured count rates compared, so that any decrease in the measured coincidence rates could be noted. If there was little or no decrease in the measured coincidence rates over a substantial time period, it was generally assumed that the random coincidence count was insignificant. This method is, of course, quite time consuming, and does not take into account at all those "singles" events derived from tube noise, or from other sources which do not rapidly decay.

U.S. Pat. No. 3,772,512 issued in the name of Laney, suggests that real coincidences can be distinguished from chance or random coincidences in multiple detectors by delaying the output pulses from one of the detectors. The theory underlying the use of the delay circuit is that the real coincidences will be eliminated by delaying the signals from one of the detectors, but the chance coincidences will occur at the same measurable rate, since they are random by nature and a time delay does not affect this characteristic of randomness. Accordingly, if the delayed signal from one detector and the undelayed signal from the other detector are applied to a coincidence determination circuit, this should yield an indication of the random coincidence rate. However, the technique is still subject to significant error, especially at relatively high sample radiation counts. At high count rates, there is an increased probability that pulses due to real coincidences, although shifted out of coincidence with each other, will nevertheless be coincident with singles events or with other "real" events.

Accordingly, there is still a need for improvement in the coincidence counting technique which utilizes a delay circuit, to provide an alternative to the solution set forth in the aforementioned patent application for the reliable estimation of the error attributable to random or chance coincidences of singles events. The present invention fulfills this need.

SUMMARY OF THE INVENTION

The present invention resides in a method and related apparatus for determining the random coincidence count due to different events which each generate single quanta of energy and which happen to be detected at substantially the same time at different ones of the two independent detectors in a scintillation counter. Briefly, and in general terms, the method of the invention comprises the steps of counting the number of measured coincidences or events detected essentially simultaneously by both detectors in the scintillation counter, delaying the pulses from one of the detectors by a fixed time delay, detecting the essentially simultaneous pulses derived from the delayed pulses from one detector and the undelayed pulses from the other detector, to obtain an approximate measure of a random coincidence count rate attributable to chance coincidences of single-quantum events, and correcting the approximate random coincidence count rate to compensate for coincidences involving at least one pulse attributable to a real coincidence. More specifically, the step of correcting the random coincidence count rate includes eliminating pulses that are coincident with pulses detected simultaneously by both detectors, delaying the signal indicative of pulses detected simultaneously by both detectors, and further eliminating pulses coincident with the delayed signal indicative of pulses simultaneously detected by both detectors.

Since the approximate random coincidence count rate is derived by detecting coincidences between delayed pulses from one detector and undelayed pulses from the other detector, the approximate count rate will include four categories of coincident pulse pairs. The most significant of these, of course, is that which includes coincidences between undelayed singles events and delayed singles events, since these represent the random coincidence count rate. The other three categories are coincidences between undelayed real events and delayed real events, coincidences between undelayed real events and delayed singles events, and coincidences between undelayed singles events and delayed real events. The first two of these three unwanted categories, both involving undelayed real events, can be eliminated by removing from consideration all of those pulses which are coincident with originally measured undelayed real coincidences. The third category, involving a delayed real event, can be eliminated by removing from consideration those pulses which are coincident with delayed real coincidences.

In terms of novel apparatus, the invention comprises first coincidence detection means for detecting real and chance coincidences between the signals from the two detectors, a first time delay means for delaying the signals from one of the detectors, and second coincidence detection means for determining the coincidences between a delayed signal from one detector and an undelayed signal from the other detector, to obtain an approximate random coincidence count rate. Also included are a second time delay means, having a time delay identical with the first, and anti-coincidence detection means for eliminating from the approximate random coincidence count rate pulses that are coincident with a signal from the first coincident detection means, and also those that are coincident with a delayed signal from the first coincidence detection means. The invention apparatus may also include counting means for accumulating a corrected count of random coincidences and a count of measured coincidences, and comparison means for comparing the corrected random coincidence count rate with an acceptable random coincidence count rate.

It will be appreciated from the foregoing that the present invention provides a simple alternative to the single photon counting technique described and claimed in the aforementioned Horrocks patent. The random coincidence count rate as thus determined may be used for comparison with an acceptable count rate, or percentage corrections can be calculated in the manner set forth in the aforementioned patent. Other aspects and advantages of the present invention will become apparent from the following more detailed description taken in conjunction with the accompanying drawings.

BRIEF DESCRIPTION OF THE DRAWINGS

FIG. 1 is a block diagram of a measurement system incorporating a scintillation counter and associated components for practicing the coincidence counting technique in accordance with the principles of the present invention;

FIGS. 2a–2c are timing diagrams showing the contrast between real coincident events, non-coincident events, and chance coincidences of unrelated events.

DETAILED DESCRIPTION

Figure 3:
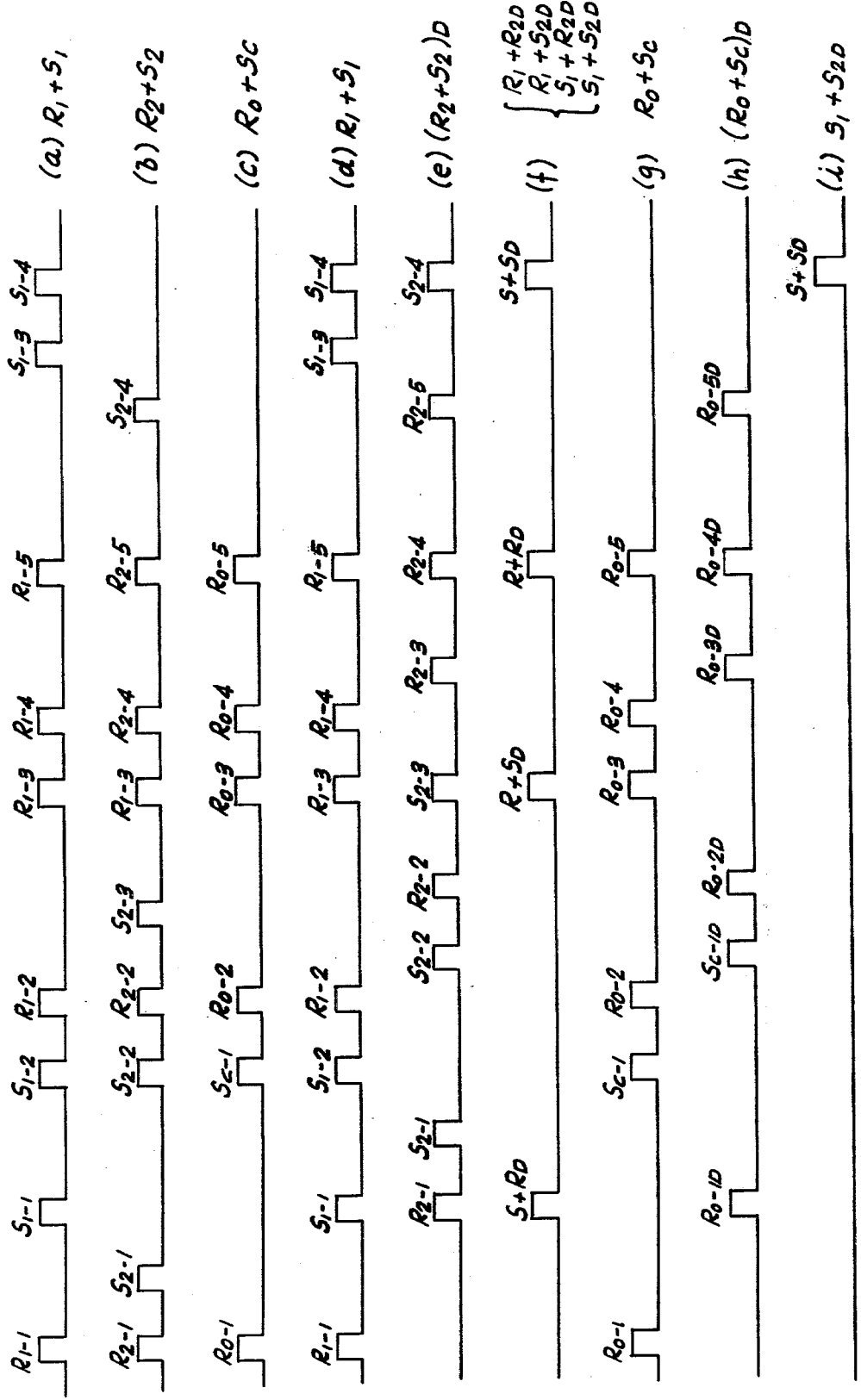
FIG. 3 is a timing diagram showing the relationship of various types of pulses detected and processed by the apparatus of the invention shown in FIG. 1.

As shown in the drawings for purposes of illustration, the present invention is principally concerned with a method for determining the error due to chance coincidences detected by utilizing the coincidence counting technique in a scintillation counter. As previously indicated, the coincidence counting technique utilizes at least two radiation detectors, usually multiplier phototubes, in order to avoid counting single-photon events resulting from chemiluminescence or similar phenomena in the sample being measured, or resulting from phototube noise which arises from thermionic emission of electrons. Although these "singles" events will normally be detected in only one multiplier phototube, the random nature of their occurrence results in the detection of a significant number of apparent coincidences that are unrelated to the radioactivity being monitored.

FIG. 1 shows in block diagram form a typical arrangement for radioactivity measurement using a liquid scintillation counter. A sample 10, is placed between a pair of photon detectors 12, which usually take the form of multiplier phototubes. In liquid scintillation counters, radioactive particles emitted by the sample material are absorbed by a liquid scintillation medium mixed with the sample itself, and the generation of a number of photons results from each emission of a radioactive particle. The photons are simultaneously, or nearly simultaneously, detected by the multiplier phototubes 12 and converted into measurable electrical pulses for output on lines 14 and 15, respectively. The output pulses from the multiplier phototubes 12 are transmitted to a summing amplifier 16, the output of the amplifier being fed to three pulse height analyzers 18, each of which can be adjusted to ignore pulses which do not fall within a selectable range of pulse heights or energy levels. The output pulses from the multiplier phototubes 12 are also transmitted to a coincidence detection circuit 20, which provides an output on line 22 if the pulses from the tubes are in coincidence, to within some preselected resolution time interval.

The coincidence signal on line 22 and the outputs from the pulse height analyzers 18 are applied to three coincidence gates 24, which function as AND gates, producing an output only when both input signals are in the same selected condition. Three scalers 26 receive output pulses from the respective coincidence gates 24, and accumulate counts in the three channels.

In accordance with the present invention, the output signals from one of the multiplier phototubes 12, on line 15, is also applied to a delay device 30, and the delayed signal is applied to a second coincidence detection circuit 32 along with the undelayed signal from the other multiplier phototube on line 14. Then, an approximate random coincidence count obtained from the second coincidence detection circuit 32 is further corrected by means of an anti-coincidence circuit 34 to which signals indicative of the approximate random coincidence rate are applied over line 36. Also applied to the anti-coincidence circuit 34 are a signal indicative of the measured coincidences, derived from line 22, and a signal indicative of the original coincidences on line 22 delayed by a second delay device 38, having the same inherent time delay as the first time delay device 30. As will be further explained, the anti-coincidence circuit 34 yields signal pulses, on output line 40, that are indicative of a corrected rate of random coincidences, i.e., coincidences that are attributable to "singles" events.

The chance coincidence pulses thus obtained on line 40 are accumulated in a scaler 42, and the measured coincidence pulses on line 22 are accumulated in another scaler 44. The accumulated count in scaler 42, indicative of the corrected random coincidence count rate, is transmitted over line 46 to a display device 48, and to a comparison circuit 50, which also receives data from the scaler 44 over line 52. The comparison circuit 50 can include any desired circuitry for comparing the value of the random coincidence count rate with an acceptable random rate, indicated at 54. The comparison circuit 50 may also have the function of generating a scaler reset signal, as indicated at 56, so that counting may be restarted automatically if the random coincidence count rate is not down to an acceptable level. This latter feature would, of course, be useful only if the chance coincidences were attributable primarily to some phenomena, such as chemiluminescence, which decayed rapidly with time.

Operation of the apparatus illustrated in FIG. 1 can be better appreciated by considering the various categories of pulses that can occur, as illustrated in simplified form in FIGS. 2 and 3. FIG. 2a shows two real coincident pulses, designated as $R_1$ and $R_2$, respectively. Since the pulses $R_1$ and $R_2$ result from only one event, they are practically coincident in time, and give rise to a real coincidence pulse, indicated as $R_0$. In relation to the block diagram of FIG. 1, if $R_1$ were to appear on line 14 and $R_2$ were to appear on line 15, the coincidence detection circuit 20 would yield the pulse $R_0$ on line 22.

FIG. 2b illustrates by way of contrast two "singles" pulses which are unrelated and non-coincident in time, and are designated $S_1$ and $S_2$, respectively. FIG. 2c indicates two unrelated singles pulses $S_1$ and $S_2$ which happen to coincide in time within the tolerance selected for the widths of the coincidence gate included in the coincidence detection circuit 20. These pulses therefore give rise to a chance coincidence pulse $S_c$. Again, in terms of the apparatus shown in FIG. 1, if pulses $S_1$ and $S_2$ were to appear on lines 14 and 15, respectively, the coincidence detection circuit 20 would yield the pulse $S_c$ on line 22.

In FIG. 3, waveform (a) indicates in simplified form a train of pulses of the kind that might appear on line 14 (FIG. 1) from one of the multiplier phototubes 12. It will be seen that waveform (a) includes two types of pulses, real pulses indicated by $R_1$ and "singles" pulses indicated by $S_1$. For purposes of further identification, the real pulses are indicated sequentially as $R_{1-1}$, $R_{1-2}$, $R_{1-3}$, etc., and the singles pulses are designated $S_{1-1}$, $S_{1-2}$, $S_{1-3}$, etc. In similar fashion, waveform (b) of FIG. 3 shows a corresponding waveform of the signal pulses appearing on line 15 from the other multiplier phototube 12. It will be observed that the same nomenclature is utilized, and that the pulses due to real events are time coincident in the two waveforms. Thus, pulse $R_{1-1}$ is time coincident with pulse $R_{2-1}$, pulse $R_{1-2}$ is time coincident with $R_{2-2}$, and so forth. The singles pulses are, of course, not generally coincident, but, for purposes of illustration, singles pulse $S_{1-2}$ is shown as being coincident in time with singles pulse $S_{2-2}$. The signal content of waveform (a) may be indicated in shorthand form as $R_1+S_1$, and the signal content of waveform (b) may be indicated in shorthand as $R_2+S_2$.

Waveform (c) represents the output of the first coincidence detection circuit 20 on line 22. It will be seen that it contains coincidence pulses for the real events, indicated as $R_{0-1}$, $R_{0-2}$, etc., and contains one chance or random coincidence, indicated as $S_{c-1}$. Waveform (c) may be designated $R_0+S_c$ in shorthand form. For convenience, waveform (a) is repeated as waveform (d). Waveform (e) is the result of time delaying waveform (b). In other words, waveform (e) represents the delayed signal output from the time delay device 30 to the second coincidence detection circuit 32. In shorthand form, waveform (e) may be indicated as $(R_2+S_2)_D$.

Waveform (f) depicts the signal that is obtained on line 36 from the second coincidence circuit, and represents coincidences between pulses in waveforms (d) and (e). As will be discussed in more detail, this signal contains pulses of four types, which may be represented in the same shorthand form as: $R_1+R_{2D}$, $R_1+S_{2D}$, $S_1+R_{2D}$, and $S_1+S_{2D}$.

The theory underlying the use of a delay to distinguish real coincidences from random ones is that the number of random coincidences between "singles" events will be unchanged if the signals from one of the multiplier phototubes is delayed in time, but that the delay destroys the time coincidence relationship between the real coincident pulses. It can be seen from FIG. 3, however, that, since waveforms (d) and (e) both contain pulses resulting from real and singles events, there is a possibility that, when the shifted and unshifted signals are compared, there will be coincidences due to pulses attributable to real events as well as due to pulses attributable to singles events. More specifically, the coincidences detected in coincidence detection circuit 32 include four distinguishable categories: an undelayed real pulse and a delayed real pulse, and undelayed real pulse and a delayed singles pulse, an undelayed singles pulse and a delayed real pulse, and an undelayed singles pulse and a delayed singles pulse. Clearly, the random coincidence count rate in which the user is interested is the one derived from coincidences in the last category of the four, i.e., between singles pulses. For an accurate determination of the random coincidence count rate, coincidences in the first three categories must therefore be eliminated.

For purposes of illustration, waveform (f) is shown as including one pulse from each of the four categories of coincident pulse pairs. Delayed pulse $R_{2-1}$ is shown as being coincident with undelayed singles pulse $S_{1-1}$, undelayed pulse $R_{1-3}$ is shown as being coincident with delayed singles pulse $S_{2-3}$, undelayed pulse $R_{1-5}$ is shown as being coincident with delayed pulse $R_{2-4}$, and undelayed singles pulse $S_{1-4}$ is shown as being coincident with delayed singles pulse $S_{2-4}$.

In order to eliminate the unwanted categories of coincident pulses from the approximately determined random coincidence count, the anti-coincidence circuit 34 is utilized. The output from the first coincidence detection circuit 20 on line 22, is employed in the anti-coincidence circuit to eliminate those coincidences due to undelayed pulses attributable to real events. As shown in waveform (g), which is identical to waveform (c), the pulse $R_{0-3}$ can be used to eliminate the coincidence in waveform (f) indicated as $R+S_D$, and the pulse $R_{0-5}$ can be used to eliminate the coincidence between unshifted and shifted real event pulses indicated in waveform (f) as $R+R_D$.

The signal representing measured coincidences, indicated by waveform (c), is also applied to the delay device 38, and the delayed signal, shown in waveform (h), is then applied, over line 39, to the anti-coincidence circuit 34. It will be seen from waveform (h) that the pulses can be utilized to eliminate the coincidence indicated as $S+R_D$, involving an delayed singles pulse and a delayed real pulse. Once the three unwanted categories of coincidences have been eliminated from waveform (f), what remains on line 40 is a signal illustrated in waveform (i), i.e., containing only pulses attributable to chance coincidences of "singles" events.

The anti-coincidence circuit 34 can be implemented in any of a variety of specific forms. In principle, it functions as an AND gate having three inputs. One input is supplied from the signals indicative of the approximate random coincidence count rate, on line 36, and the other two inputs are derived from inverted forms of the signals on lines 22 and 39, respectively. It will be appreciated, however, that somewhat more complex, yet perfectly conventional, logic will be needed to take care of situations in which pulses to be eliminated from waveform (f) are not exactly in coincidence with corresponding pulses in waveforms (g) and (h).

There is a very small probability that coincidence pulses even of the type attributable to "singles" pulses only will be eliminated by the aforedescribed technique. The possibility exists that the time of occurrence of one of the random pulses $S+S_D$ in waveform (f) will almost exactly correspond with the time of occurrence of a chance coincidence as indicated by $S_c$ in waveform (g) or waveform (h). It is believed, however, that the probability of this occurring is extremely low, and that the probability can be ignored for most practical purposes.

It will be appreciated from the foregoing that the present invention provides a simple and practical alternative technique for obtaining an indication of the random coincidence count rate in a scintillation counter using the coincidence technique. It will also be appreciated that, although a specific embodiment of the invention has been described in detail for purposes of illustration, various modifications may be made without departing from the spirit and scope of the invention. Accordingly, the invention is not to be limited except as by the appended claims.

I claim:

1. For use with a scintillation counter utilizing at least two detectors in a coincidence counting technique, a method for determining a random coincidence count due to events resulting in single-quantum emissions which may chance to occur in such a manner that pairs of essentially coincident single-quantum events are detected one in each detector and are erroneously counted as radioactive disintegrations occurring in a sample, said method comprising the steps of:

delaying output pulses from one of the detectors;
    detecting coincidences between the delayed pulses from one detector and the undelayed pulses from the other detector, to obtain a signal indicative of an approximate random coincidence count; and correcting the approximate random coincidence count to compensate for coincidences involving at least one pulse due to a real coincidence attributable to events resulting in multiple-quanta emissions.

2. A method as set forth in claim 1, wherein said correcting step includes:

conventionally detecting real coincidences between pulses from the two detectors;

delaying the real coincidences between the two detectors;

eliminating pulses that are coincident with the real coincidences; and eliminating pulses that are coincident with the delayed real coincidences, to obtain a signal indicative of a corrected random coincidence count.

3. A method as set forth in claim 2, and further including the steps of:

comparing the corrected random coincidence count rate with an acceptable value; and restarting counting if the corrected rate exceeds the acceptable rate.

4. For use with a scintillation counter utilizing at least two detectors in a coincidence counting technique, a method for determining a random coincidence count due to events resulting in single-quantum emissions which may chance to occur in such a manner that pairs of essentially coincident single-quantum events are detected one in each detector and are erroneously counted as radioactive disintegrations occurring in a sample, said method comprising the steps of:

detecting real and apparent coincidences between pulses from the two detectors;

delaying pulses from one of the detectors;

detecting coincidences between the delayed pulses from one detector and undelayed pulses from the other, to obtain a random coincidence pulse train from which an approximate random coincidence count rate can be determined;

delaying the real and apparent coincidences between pulses from the two detectors;

eliminating from the random coincidence pulse train, in an anti-coincidence circuit, those coincidence pulses that occur essentially simultaneously with, and are therefore attributable to, either originally detected real and apparent coincidences, or delayed real and apparent coincidences, to obtain a corrected random coincidence pulse train;

accumulating a count of pulses occurring in the corrected random coincidence pulse train, to obtain a corrected random coincidence count rate.

5. A method as set forth in claim 4, and further including the steps of:

comparing the corrected random coincidence count rate with an acceptable value of the rate; and reinitiating the measurement process if the corrected random coincidence count rate exceeds the acceptable value.

6. For use with a scintillation counter utilizing at least two detectors in a coincidence counting technique, apparatus for determining a random coincidence count due to events resulting in single-quantum emissions which may chance to occur in such a manner that pairs of essentially coincident single-quantum events are detected one in each detector and are erroneously counted as radioactive disintegrations occurring in a sample, said apparatus comprising:

first coincidence detection means for detecting real and chance coincidences between pulses from the two detectors;

time delay means for delaying pulses from one of the detectors;

second coincidence detection means for detecting coincidences between delayed pulses from said time delay means and undelayed pulses from the other of the detectors, to obtain a pulse train indicative of an approximate random coincidence count; and compensating means for correcting said pulse train indicative of an approximate random coincidence count, to obtain thereby a pulse train indicative of a corrected random coincidence count.

7. Apparatus as set forth in claim 6, wherein said compensating means includes:

second time delay means for delaying output pulses from said first coincidence detection means by a time equal to the delay time of said first time delay means; and anti-coincidence circuit means for eliminating from said pulse train indicative of an approximate random coincidence count any pulses coincident with output pulses from said first coincidence detection means and any pulses coincident with output pulses from said second time delay means.

8. Apparatus as set forth in claim 7, and further including:

counting means for accumulating a corrected random coincidence count; and comparison means for comparing the corrected count with a preselected value.

* * * * *